United States Patent [19]

Magnuson

[11] Patent Number: 4,884,898
[45] Date of Patent: Dec. 5, 1989

[54] LINEAR MOTION PILLOW BLOCK INCLUDING FINE TUNING FEATURES

[75] Inventor: Robert E. Magnuson, South Orange, N.J.

[73] Assignee: Lee Controls, Inc., Piscataway, N.J.

[21] Appl. No.: 306,588

[22] Filed: Feb. 6, 1989

[51] Int. Cl.$^4$ .................... F16C 29/04; F16C 29/12
[52] U.S. Cl. ........................................ 384/58; 384/52; 384/57
[58] Field of Search ................. 384/29, 37, 40, 50, 384/52-54, 57, 58

[56] References Cited

U.S. PATENT DOCUMENTS

| | | | |
|---|---|---|---|
| 3,749,455 | 7/1973 | Meier | 384/52 X |
| 4,264,112 | 4/1981 | Magnuson | 384/29 |
| 4,390,216 | 6/1983 | Mueller et al. | 384/54 |
| 4,715,730 | 12/1987 | Magnuson | 384/52 |

OTHER PUBLICATIONS

Brochure, The Barden Linear Bearing, Catalog Number L1, The Barden Corp. Danbury Conn. 06810, copyright 1978, pp. 1-12.
Brochure entitled Thomson Shaft Supports, Thomson Industries, Inc. Manhasset, N.Y., 11030, pp. 1-6, copyright 1969.
Catalog, Thomson Linear Motion Designer's Guide, 1982, pp. 2-71.

Primary Examiner—Thomas R. Hannon
Attorney, Agent, or Firm—Martha G. Pugh

[57] ABSTRACT

This patent relates to pillow blocks, which are constructed to include one or more roller bearings disposed in tangential relation to the primary shaft at one or more positions around its periphery. Each roller bearing is mounted to rotate about its own stud, so that it acts as a cam follower. In some embodiments the roller bearings are disposed singly, or in pairs, in three positions spaced-apart 120 degrees around the periphery of the shaft. A particular feature of the invention is a device for fine tuning the tangential contact between a roller and the surface of the primary shaft by utilizing a flexible bearing support plate supporting at least one bearing. The plate can move radially to control the radial distance of the bearing.

20 Claims, 6 Drawing Sheets

LINEAR MOTION PILLOW BLOCK INCLUDING FINE TUNING FEATURES

FEATURES

This relates to linear motion pillow blocks of a type which are applicable to floating pillow blocks which serve as bearings and guides in a slide assembly for a reciprocating carriage.

BACKGROUND OF THE INVENTION

Systems comprising shafts which are constructed for slideable linear motion in cylindrical bearings are subject to a high degree of friction, and wear, binding and chatter because of misalignment, which lead to lubrication and maintenance problems.

Attempts have been made to reduce or eliminate some of the problems in such systems by using one or more oblong re-circulation ball circuits or Roundway bearings which circulate in the longitudinal direction of the shaft.

Such systems have certain disadvantages, in that they are heavy, requiring a substantial amount of additional material; and the circulating ball or roller trains retain dirt and foreign particles. Furthermore, they exert extreme pressures at the points of contact on the shaft which cause what is known as 'brinelling' in which the material of the shaft flakes away. Further, such systems cause excessive wear at contact points on the shaft.

A linear motion pillow block is disclosed in U.S. Pat. No. 4,715,730, hereby incorporated by reference. This disclosure includes a description of a pillow block having a self-aligning feature. The self-aligning feature is described, for example, at Column 5, line 47 through Column 6, line 34. The self-aligned feature includes a bearing which is connected to an eccentric cylinder stud. The device can be fine tuned by turning the eccentric cylinder stud to cause the circumferential surface of the bearing to move radially toward the surface of the shaft passing through the primary bore of the pillow block.

SUMMARY OF THE INVENTION

The present invention is directed to an improved pillow block design having bearings, and a simplified means to fine tune operating positions of the bearings of the pillow block. The fine tuning means of the present invention is easy and simple to operate and easy to assemble and adjust.

The pillow block of the present invention comprises a pillow block body with a primary bore having a principal axis. The bore has a cross-sectional area in a direction perpendicular to the principal axis which corresponds to the cross-sectional shape of the shaft on which the pillow block is mounted. The cross-sectional area permits the pillow block to be slideably mounted on the shaft. Typically, the shaft has a circular cross-section. The cross-section of the bore has a shape corresponding to at least a portion of the cross-sectional shape of the shaft to enable the pillow block to be mounted on the shaft along the bore. Preferably, the cross-section of the bore is at least a portion of a circle. The pillow block is constructed to be slideably accommodated on a primary shaft having a shaft surface.

The pillow block has at least one outer surface (See FIG. 3, reference character 28) which is generally circumferential to the principal axis. The outer surface extends at least part of the distance in the circumferential direction. There is at least one bearing support surface communicating between the primary bore and the outer surface. At least one bearing mount is connected to the bearing support surface. There is at least one bearing mounted on the bearing mount. The bearing has a circumferential bearing surface. The bearing is located to make tangential contact between the primary shaft surface and the circumferential surface of the bearing.

There is an axial slot extending axially for a part of the axial length of the pillow block. The slot is located at a radial distance from the primary bore up to the bearing mount. The portion of the pillow block body between the slot and the outer surface of the pillow block is a bearing support plate. The pillow block of the present invention has at least one bearing support plate. The bearing support plate is separated from the pillow block body over the area of axial slot. At least one bearing is mounted on the bearing support plate. The pillow block is considered a separate element from the bearing support plate, although it is permanently and integrally attached to the pillow block body.

The present invention includes a means to adjust the radial position of the bearing support plate relative to the primary bore. In preferred embodiments the bearing support plate is flexible and capable of being moved radially toward and/or away from the principal axis of the primary bore. The pillow block body is radially stationary relative to the radial movement of the bearing support plate. The means to adjust the radial position of the bearing support plate is preferably at least one screw means communicating across the axial slot. The screw means contacts a portion of the pillow block body and a portion of the flexible bearing support plate. When the screw is turned, radial pressure is exerted between the bearing support plate and the body of the pillow block to adjust the radial position of the bearing support plate. There can be one or more screw means to adjust the distance of the bearing mount plate toward or away from the principal axis of the primary bore.

The pillow block of the present invention is preferably constructed to include a plurality of bearings, preferably roller bearings, disposed in tangential contact with the primary shaft. The bearings can be disposed at one position, or at a plurality of positions, spaced-apart around the periphery of the bore, each bearing being mounted to rotate about its own stud. The roller bearing makes rolling contact with the primary shaft.

It is contemplated that the improved adjustable or floating pillow blocks of the present invention can be used in a system comprising a pair of substantially parallel metal shafts on which are mounted a carriage comprising a metal plate, or other suitable material, or other configuration to be supported and capable of moving along the length of the shaft. Preferably, the carriage is a substantially flat metal plate supported at or near its four corners by four pillow blocks. Such a system is described in detail in U.S. Pat. No. 4,264,112, issued Apr. 29, 1981, which is incorporated herein by reference.

Several different embodiments of the improved adjustable pillow blocks of the present invention are disclosed. In one embodiment, the roller bearings are rotatably disposed on studs which are located at suitably selected angles, preferably 120 degrees apart, around the periphery of the shaft and transverse to its principal axis. In another embodiment, in each of the positions, a pair of roller bearings is respectively mounted on a pair of studs aligned with the primary shaft.

A particular feature of the invention is a device for making fine adjustments in the radial position of at least one of the roller bearings. A screw means can be used to force a flexible bearing support plate on which at least one bearing is mounted to flex radially. There can be more than one screw. Where there is one bearing there can be one screw or one screw axially spaced on each side of the bearing. Where bearings are used in axial pairs, one bearing of the pair can be adjusted relative to the other bearing. This can be accomplished by one screw means axially spaced on each side of the pair and an additional screw means between the pair. By adjusting the three screw means the axial bearings can be adjusted radially to each other.

The systems of the present invention using one bearing at each circumferential position have the advantage of providing self-alignment of a linear motion pillow block utilizing a relatively light-weight structure of roller bearings which do not retain dirt and foreign particles and which are less likely to be subject to rust and corrosion than prior art types. The use of one bearing allows a limited amount of axial movement of the pillow block. Furthermore, extreme pressures are avoided at the points of contact between the bearings and the shaft, thereby minimizing brinelling.

It will be understood that while the improved pillow blocks of the present invention are highly suitable for use in a system such as disclosed in my prior U.S. Pat. No. 4,264,112 supra, they are not limited to use in such system, and may have other applications.

These and other advantages will be better understood by a study of the detailed specification hereinafter with reference to the attached drawings.

BRIEF DESCRIPTION OF THE DRAWINGS

FIG. 4 is a perspective view of an alternate embodiment of the pillow block of the present invention. FIG. 4 includes three single ball bearing rollers which are mounted to bear on a primary shaft. There is a bearing mount plate fixed on both ends for fine tuning the pillow block on a primary shaft.

FIG. 4A is a side-elevation view of FIG. 4 taken from the side of the pillow block having the fine tuner element of the present invention.

FIG. 4B is a partial sectional view taken along the plane indicated by arrows 4A—4A of FIG. 4A.

FIG. 4C is a top-elevation view of FIG. 4.

FIG. 4D is an elevation view taken through the plane indicated by arrows 4D—4D of FIG. 4B.

FIG. 5 is a perspective view of a modification of the pillow block of the present invention.

FIG. 6 is a perspective view of an alternate embodiment of the pillow block of the present invention.

Corresponding elements in the various drawings have two common reference characters. In the embodiments shown in FIGS. 4 through 4D, 400 has been added to each of the reference characters of FIGS. 3 through 3D similarly designated and being substantially identical unless otherwise indicated. Similarly, 500 has been added to the designations of FIGS. 5 through 5D, and 600 has been added to each of the designations of FIGS. 6 through 6D.

DETAILED DESCRIPTION OF THE INVENTION

The pillow blocks described hereinafter are preferably designed for use in a system of the general types disclosed in my prior U.S. Pat. No. 4,264,112 which is incorporated herein by reference, or for that matter, in any type of system in which the pillow block is journaled in slideable relation to a shaft, except that the detailed structure of the pillow blocks will be as disclosed herein. Typically, such a system comprises at least two and preferably at least four pillow blocks suitably fastened to a carriage means. A typical carriage means is a flat rectangular carriage plate, as shown and described in my U.S. Pat. No. 4,264,112 supra. The pillow blocks are suitably fastened to it, preferably to the underside at or near the corners of a square or rectangular carriage plate. For the purpose of illustrating the present invention, a number of pillow block embodiments will be described. It will be understood that identical or different pillow blocks can be attached to a typical carriage plate at suitable positions.

Figure 1:
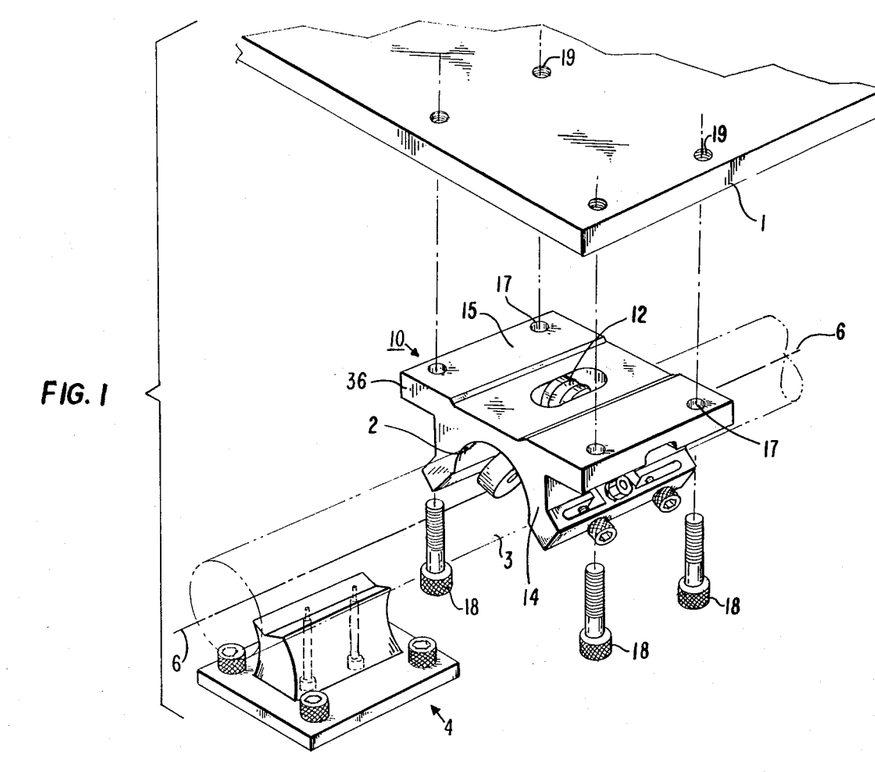
FIGS. 1 and 2 are exploded views, in perspective, illustrating two pillow blocks of the type useful in the present invention, in their environment.
Figure 2:
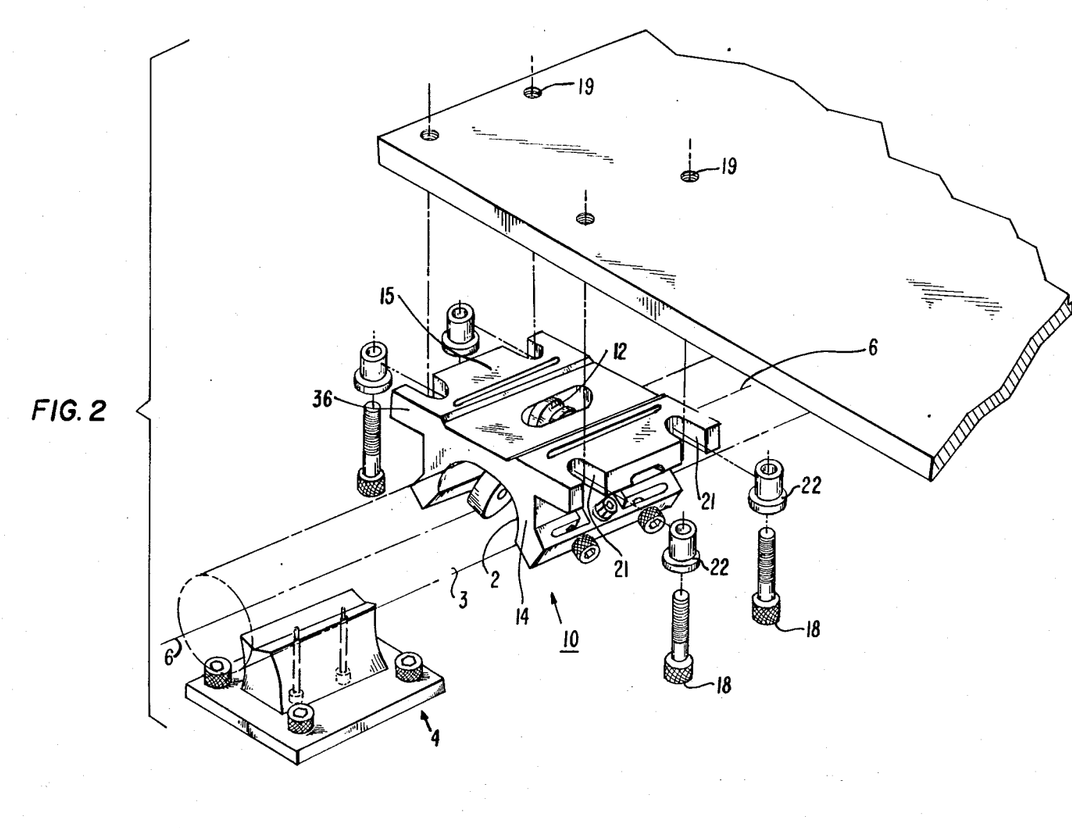

FIGS. 1 and 2 are exploded views of a pillow block of the type useful in the present invention in their environment. The pillow blocks 10 have a bore 2 and are mounted on a primary shaft 3. The primary shaft 3 is typically circular or partially circular in cross-section. However, the shaft 3 can be of any suitable shape. The shaft is preferably made of metal such as steel. Primary shaft 3 is mounted and secured to a suitable base support assembly such as generally shown as reference character 4. Preferably, the bore 2 has a cross-sectional shape corresponding to at least part of the cross-sectional shape of the shaft 3. The shape of the bore provides a sufficient opening to permit the pillow block 10 to be supported on the shaft. Preferably, the shape corresponds at least partially to the shape of the bore. The bore 2 in the Figures is a partial circle to sit on a shaft having a circular cross-section.

For the purpose of the present invention the primary shaft 3 has a primary shaft principal axis 6. This axis substantially coincides with the axis of the circular bore 2 of pillow block 10.

The pillow block 10 of the present invention has at least one bearing means, preferably at least two bearings, and most preferably, at least three bearings. The preferred bearings are preferably ball bearing rollers (roller bearings), or needle rollers, disposed to bear on the primary shaft. The bearings can be at suitable positions for support and are preferably at positions symmetrically spaced-apart around the periphery of the bore. In a preferred embodiment the bearings are spaced at angles of 120 degrees apart in a plane perpendicular to the principal axis. The roller bearings are respectively mounted so that their circumferential surfaces engage the surface of primary shaft 3. A radial plane through a first roller bearing 12 passes through the principal axis 6. The two second roller bearings also have radial planes passing through the principal axis preferably at 120 degrees in the plane through first roller bearing 12.

The pillow blocks illustrated in FIGS. 1 and 2 have a pillow blockbody 14. There is preferably a pillow block support plate 15 having a support surface which preferably is in a plane perpendicular to the plane of first roller bearing 12. Typically, the support plate 15 is horizontal, although it is not so limited. There are suitable means to connect carriage plate 1 to the support plate 15 of pillow block 10. In the embodiment of FIG. 1 there are a plurality of support plate holes 17. Preferably, there are four support plate holes 17 at the corners of support plate 15. Carriage plate 1 has corresponding threaded carriage plate holes 19. Support plate threaded screws 18 pass through support plate holes 17 and thread into carriage threaded holes 19 to secure the carriage plate to the support plate 15 of the pillow block 10.

FIG. 2 is similar to FIG. 1 except that there is a modified means to attach the pillow block 10 to the carriage plate 1. The pillow block support plate 15 has ridged slots 21. Bushings 22 are fastened to carriage plate 1 and fit loosely in slots 21 sitting on the ridges in the slots 21. This allows the pillow block to slide from side-to-side to follow the position of shaft 3. Support plate screws 18 pass through the spacers 22 and are securely threaded into carriage threaded holes 19 to secure carriage plate in to the pillow block 10. While other means to secure the pillow block to the carriage plate can be envisioned, these two preferred ways are useful in illustrating the present invention.

Typically, the pillow block 10, such as illustrated in FIGS. 1 and 2, is from 1 to 6 inches, preferably 1½ to 3 inches long in the axial direction. The pillow block 10 is typically 2 inches to 8 inches, preferably 4 to 6 inches wide in the direction perpendicular to the axial direction and in a plane of the support plate. The pillow block 10 is from 1½ to 6 inches, and preferably, 1 inch to 4 inches high in the dimension perpendicular to the plane of the carriage plate 1. A typical primary shaft 3 is from 1 to 3 inches in diameter and typically, 1½ inches in diameter. The partial circular bore 2 has a diameter which is typically 1/32 to ¼ inch, and preferably, 1/16 inch in diameter greater than the diameter of the primary shaft 3.

The preferred bearings are roller bearings, such as roller bearing 12, of the type illustrated in FIGS. 1 and 2. Such bearings can generally be mounted to the pillow block 10 in a manner disclosed and described in U.S. Pat. No. 4,715,730, hereby incorporated by reference.

The present invention is a means for fine tuning the position between the ball bearing rollers and the primary shaft 3. It is not necessary for all of the bearings to be in contact with shaft 3. There can be a space of from 0.0 inch to 0.003 inch and preferably less than 0.001 inch between at least one bearing and the shaft. The present invention is useful in the pillow block 10 illustrated in FIGS.1 and 2. Specific embodiments of the means to fine tune the contact between the bearings and the primary shaft 3 will be described with reference to the embodiments illustrated in FIGS. 3 through 6. The embodiment illustrated in FIGS. 3 through 3D has common reference characters for common elements as those in FIG. 1.

Figure 3:
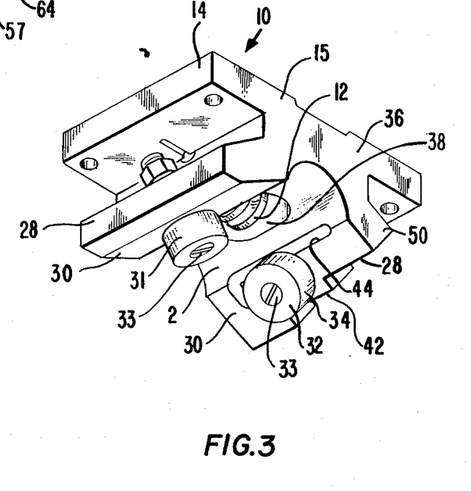
FIG. 3 is a perspective view of a preferred embodiment of a pillow block of the present invention which includes three single ball bearing rollers disposed to bear on the primary shaft at positions symmetrically spaced-apart at angles of 120 degrees around its periphery. One of the rollers is mounted on a cantilevered bearing mount plate, there being a set screw disposed to adjust the radial position of the bearing support plate.
Figure 3A:
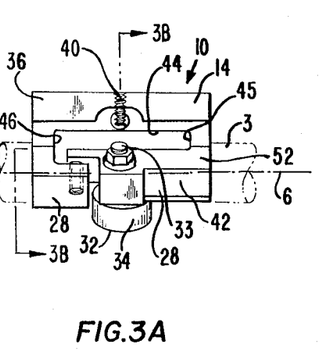
FIG. 3A is a side-elevation of FIG. 3 taken from the side on which the fine tuning element of the present invention is located.
Figure 3B:
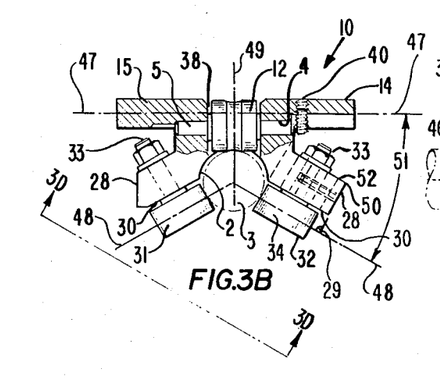
FIG. 3B is a partial sectional view taken along the plane indicated by arrows 3B—3B of FIG. 3A on a primary shaft.
Figure 3C:
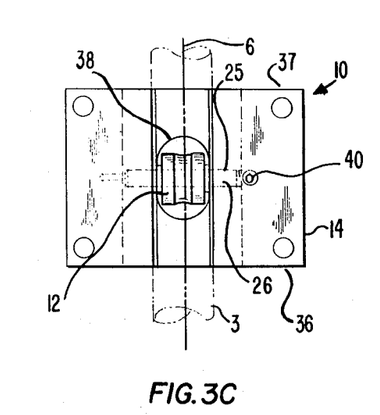
FIG. 3C is a top-elevation of FIG. 3.
Figure 3D:
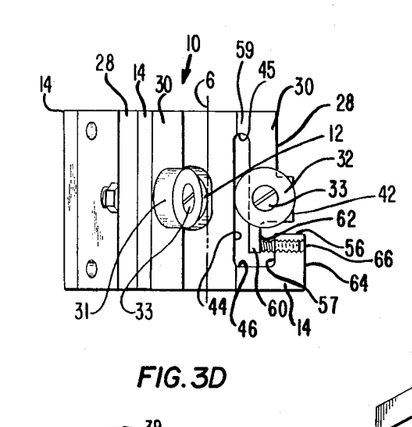
FIG. 3D is an elevation taken along the plane 3D—3D of FIG. 3B.

The pillow block illustrated in FIGS. 3 through 3D is one embodiment of the improvement of the present invention. Briefly, a tuned roller bearing 32 is mounted on a portion of the pillow block 10 characterized as a bearing support plate 42. The bearing support plate 42 is a diaphragm type plate formed by undercutting a slot 44 between the surface of the pillow block and the bore 2. The slot 44 can be any suitable thickness and the bearing plate 42 can be any suitable thickness and length. The dimensions are sufficient to permit the plate 42 to be moved in accordance with the fine tuning means of the present invention. The slot is preferably an axial slot 44, separating the bearing support plate 42 from the pillow block body 14. The bearing support plate remains integrally connected to the pillow block body 14 on at least on one side of the slot. (See first slot end 45). There is a means to control the radial position of the tuned bearing 32 mounted on this bearing support plate 42 by controlling the radial position of the bearing support plate 42. In the embodiment of FIG. 3 the bearing support plate 42 is a cantilever type construction. There is a means, such as a set screw, to assert a force on the free end of the cantilevered bearing support plate 42 to control the radial position of the plate. A tuned roller bearing 32 on the plate 42 is thereby moved radially toward and away from the primary shaft 3.

More specifically, the pillow block 10 illustrated in FIGS. 3 through 3D comprises a pillow block body 14. The pillow block body has a primary bore 2, preferably a partial circular bore 2, having a principal axis 6 constructed to be slideably accommodated on a primary shaft 3 having a shaft surface. The pillow block 10 has at least one outer surface 28 which is generally circumferential to the principal axis 6. By generally circumferential, it is meant that the angle 29 between a radial plane through the principal axis 6 and a plane generally through the circumferential surface 28, is preferably greater than 45 degrees, and more preferably, from 45 degrees to 135 degrees, and most preferably, about 90 degrees. The specific shape of this surface is not critical. There is a bearing support surface 30 communicating between the primary bore 2 and the circumferential surface 28. Preferably, the bearing support surface 30 is in a plane parallel to the primary axis 6.

There is at least one tuned bearing 32 which can be fine tuned in accordance with the present invention. The bearing is preferably mounted on the bearing support surface 30. The tuned bearing 32 is mounted by a suitable mount means 33, such as the nuts and bolts illustrated in FIGS. 3 through 3D.

As indicated in the above description with regard to FIGS. 1 and 2, there can be a first roller bearing 12.

Referring to FIG. 3C, the first roller bearing 12 is illustrated to be mounted on secondary shaft 26 within secondary bore 25. The secondary bore 25 is interposed through the thickness of the pillow block 10, midway between the axial surfaces 36 and 37 of the pillow block 10. Referring to FIGS. 3B and 3C, the secondary bore 2 is preferably normal to the axis 6 of 10 the shaft 3 and passes through first bearing slot 38. First bearing slot 38 passes through support plate 15 communicating from the upper surface of support plate 15 to the primary bore 2. A typical first bearing slot is from 1 to 2 inches long in the direction of the principal axis 6, and from ⅜ to 1 inch wide. There should be sufficient opening to the outer surface of support plate 15 for first roller bearing 12 to fit. The first roller bearing 12 is mounted on secondary shaft 26 which is from typically about 1½ to 3 inches long and from about ⅛ inch to ½ diameter. The secondary shaft 26 is retained at one end by a suitable means such as shaft set screw 40 shown in FIG. 3B. The set screw 40 is located in a screw-threaded socket normal to secondary bore 25, the latter being in a position in the horizontal plane which is substantially normal to the axis of the primary shaft 3. The first roller bearing 12 is rotatably mounted on the secondary shaft 26, so that its circumferential surface, which can be slightly concave, bears slideably and in rolling tangential contact with the surface of primary shaft 3.

At least one of the second bearings mounted on the bearing mounts 33 is a fine tuned bearing, such as tuned bearing 32. At least one fine tuned bearing 32 is mounted on at least one bearing support plate 42. The bearing support plate 42 is located between a circumferential outer surface such as surface 28 and a space such as an axial slot 44. The axial slot 44 extends axially for a part of the axial length of pillow block 10. The slot 44 is located at a radial distance from the primary bore 2 up to the bearing mount means 33 and is defined by the space between the bearing support plate 42 and the pillow block body 14. The axial slot 44 has a first axial slot end 45 and a second axial slot end 46. The slot can be in a plane parallel to the primary axis 6 or can be irregular along its axial length. The slot 44 is preferably at least 1/16 inch wide and preferably from 1/16 to ¼ wide in the radial direction. The slot preferably extends ¾ inch to 2½ inches in the axial direction. The slot should extend sufficiently in the circumferential direction to permit functional radial movement. Preferably, the slot passes through support surface 30 and opposite surface 52. The bearing mounts 33 are typically up to 0.25 inch and, preferably, up to about 0.1 inch at their closest point from axial slot.

The bearing support plate 42 should be sufficiently flexible so that it can be moved radially toward and away from the principal axis 6. The bearing support plate 42 functions as a diaphragm capable of being moved radially. 15 The pillow block 10 is made of a material which permits the bearing support plate 42 to flexibly move in the radial direction. Preferably, the material is flexible and elastic enough to radially move and then return to its original position after a plurality of flexes. The pillow block is preferably made of metal such as steel, aluminum, brass or the like. The pillow block can be made of non-metal, such as filled polymers or composites. Most preferred is a pillow block as shown in the Figures made of extruded aluminum. The most preferred aluminum is grade 6061 as described in Materials Engineering, Materials Selector 1989, page 89, Penton Publishing, December 1988. Aluminum 6061 is indicated to contain 0.8–1.2 wt % Mg, 0.4–0.8 wt % Si, 0.15–0.35 wt % Cr, and 0.15–0.40 wt % 0.40. It has a tensile modulus of $10 \times 10^6$ pounds per square inch (psi) and a tensile strength (annealed) of $18 \times 10^3$ psi. Other aluminum or metal alloys can be used. The design of the bearing support plate of the pillow block should be considered with changes of 10 material.

The radial movement of the bearing support plate 42 is preferably a movement radially away from the principal axis (plus) or radially toward the principal axis (minus) of plus or minus 0.05 inches, preferably, plus or minus 0.025, and most preferably, plus or minus 0.030 inch. By moving the flexible bearing support plate 42 the fine tuned bearing 32 can be moved toward and away from the surface of primary shaft 3. This can adjust the pillow block 10 on shaft 3 and assure uniform sliding between a plurality of pillow blocks 10 on a common primary shaft 3. Additionally, it permits further fine tuning so that the pillow blocks 10 on adjacent shafts can be adjusted to cooperate and assure easy and smooth movement of the carriage plate 1.

In the preferred embodiments the support plate 15 has a support plane 47 parallel to the principal axis 6 as shown in FIG. 3B. Although not so limited, the support plane 47 is preferably horizontal. There is a first roller bearing 12 and at least two second roller bearings 31 and 32 having bearing planes 48 which pass through the principal axis 6. There is a pillow block plane 10, preferably a vertical plane 49, defined as plane perpendicular to the support plane 47 and passing through the principal axis 6. Preferably, there is at least one bearing located where the angle between the pillow block plane 47 and one second bearing plane 48 is about 120 degrees, and at least one bearing located where the angle between the pillow block plane 47 and a second bearing plane 48 is about 240 degrees, rotating clockwise from the intersection of the support plane 47 and the pillow block vertical plane 48.

Referring to FIG. 3B, axial slot 44 generally extends through a portion of the pillow block 10 such as radial extension 50. Radial extension 50 has two radial surfaces. There is bearing support surface 30 and opposite radial extension surface 52. Both bearing support surface 30 and opposite radial extension surface 52 are generally directed radially to the principal axis 3. The radial extension 50 generally extends axially. Circumferential surface 28 generally is circumferential to the principal axis 6. In the preferred embodiment shown in FIG. 3D the angle 51 between planes 47 and 48 is from 15 degrees to 75 degrees and preferably 30 degrees to 45 degrees.

The axial slot 44 in the preferred embodiment of the present invention extends through radial extension 50 from the bearing surface 30 to the opposite radial extension surface 52. As shown in FIG. 3B, in the preferred embodiment of the present invention the tuned bearing 32 is mounted on a roller bearing axle 33 on the bearing support surface 30 of bearing support plate 42. The bearing axle 33 is at a distance so that the bearings each have a circumferential bearing surface which tangentially intersects the surface of primary shaft 3. Typically, the closest point on the bearing axle to the axle slot 44 is less than 0.1 inch. The tuned bearing 32 has a circumferential bearing surface 34 which can be moved radially to adjust the distance between that surface 34 and the surface of the primary shaft 3.

Referring to FIG. 3D, the means to adjust the radial position of the bearing support plate 42 is preferably a screw means 66 which can adjust the distance between the circumferential surface 34 of the roller bearing and the surface of primary shaft 3. The screw means 66 communicates across the axial slot to assert a radial pressure on the bearing support plate 42. The pressure is asserted between the bearing support plate 42 and the pillow block body 14.

In the embodiment shown in FIGS. 3 through 3D the bearing support plate 42 has a radial slot 56 communicating between second axial slot end 46 and circumferential surface 28 through the pillow block body 14. The radial slot 56 has an axial slot jog 57. The axial slot jog is at a radial distance from the principal axis greater than the radial distance to the axial slot 44, and between the axial slot 44 and the outer surface 28. The axial jog 57 extends for part of the axial distance of the bearing support plate 14 in a direction towards the first end 45 of the axial slot 44.

This results in the bearing support plate 42 having an axial fixed end 59 and an axial free end 60. The bearing support plate 42 is thereby cantilevered out from the fixed end 59. The axial slot jog 57 extends between the free end 60 of the fine tuner extension 64 and outer surface 28 of the pillow block body. The portion of the bearing support plate 42 over which the axial slot jog extends is free end ledge 62. There is a fine tuner extension 64 of the pillow block body 14 between the axial jog 57 of the radial slot 56 and the outer surface 28. The means to adjust the radial distance of the bearing support plate 14 communicates between the tuner extension 64 and the free end ledge 62. This can be a screw means 66 which intersects or is attached at one end to the free end ledge 62 and is threaded through the tuner extension 64. The screw means can force the bearing support plate 42 radially toward the principal axis 6. Alternatively, the screw can be attached to the free end ledge 62 and pull the bearing support plate 42 radially away from the principal axis 6. The screw means 66 can be a set screw which merely pushes the free end ledge 62 radially toward the principal axis 6. When the screw is unscrewed or loosened, the flexible bearing support plate 42 returns elastically to its normal position.

In the present embodiment, the roller bearings are of a cam follower type designated "CYR series cam yoke CAMROL bearings", of the form described in detail on page 30 of Catalogue H-80A, published September 1985 by the McGill Manufacturing Company, Inc., Bearing Division, Valparaiso, Ind. 46383-4299. It will be understood that other similar type bearings of suitable form can be used. In the presently described embodiment, the periphery of at least one of the rollers 12 is formed to include a concavity in cross-sections, as indicated in the drawing, which concavity substantially matches the curvature of the primary shaft, on which they are designed to ride in contacting relation, making substantially uniform contact. This eliminates point contact with at least one bearing. It will be understood that the concavity of the rollers is optional. For example, the concavity may be applied to the top roller only, and not to the laterally-disposed roller. The rollers are preferably disposed symmetrically in a vertical plane centered between the front and rear faces of the pillow block. They are disposed around the periphery of the bore, centered so as to form suitable angles, preferably of 120 degrees, with the positions of ball bearing rollers. All of these rollers are substantially identical in form, and they are mounted so that they are each disposed in the same vertical planes, as shown in the vertical sectional view 3B.

Figures 4, 4A, 4B, 4C, 4D:
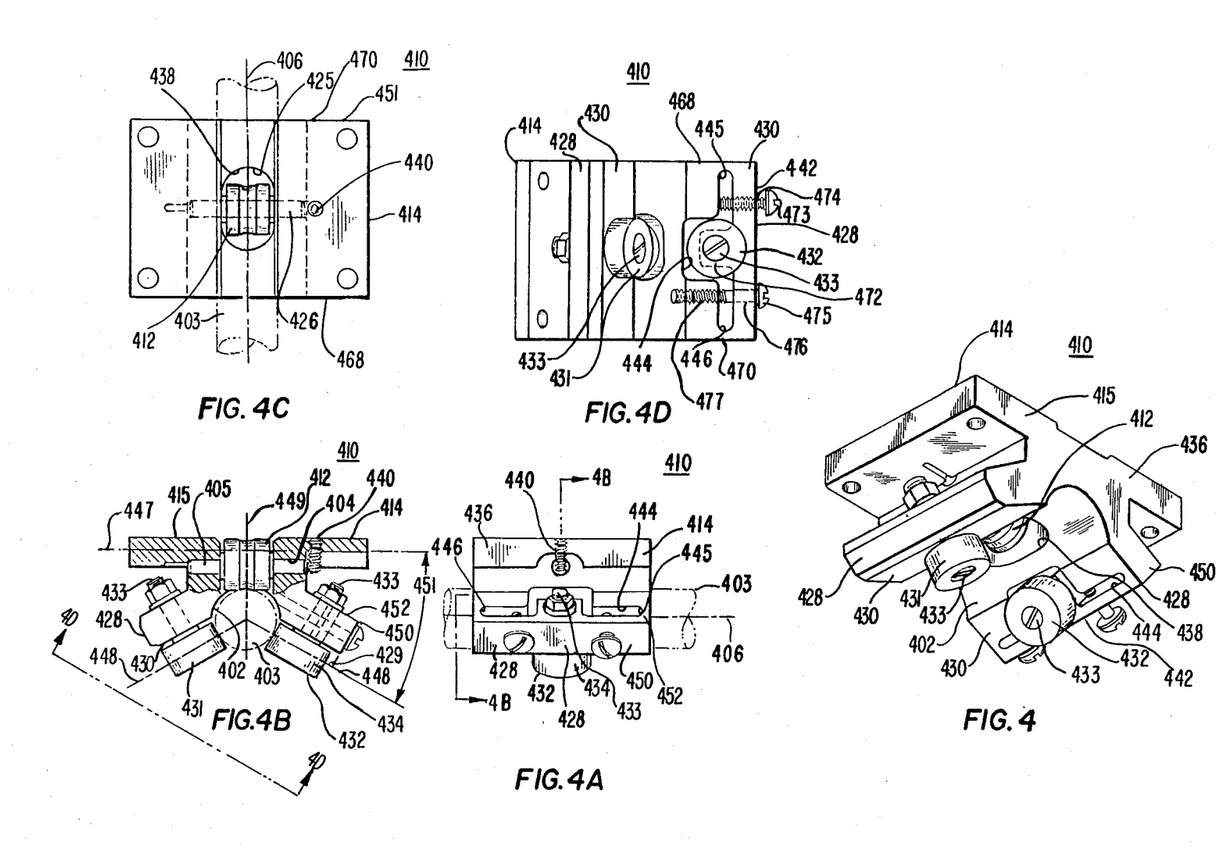

FIGS. 4 through 4D show an alternate embodiment of the pillow block described with reference to FIGS. 1 through 3D. To simplify the description, 400 has been added to each of the reference characters of FIGS.1 through 3D for similarly designated elements which are substantially identical unless otherwise indicated. Reference is made to the above description with regard to these common numbered elements.

The pillow block illustrated in FIGS. 4 through 4D has a pillow block body 414 having a first axial end 468 and a second axial end 470. The bearing support plate 442 is between the outer surface 428 and an axial slot 444. The axial slot 444 extends for a part of the axial length of pillow block 414. The axial slot is located between first axial end 468 and second axial end 470. The first axial slot end 445 is located closest to the first axial end 468, and the second axial slot end 446 is located closest to the second axial end 470. The axial slot 444 is located at a radial distance from the primary bore 402 up to the bearing mount 433. The axial slot 444 is defined as the space between the bearing support plate 442 and the body 414 of the pillow block.

In the specific embodiment illustrated in FIGS. 4 through 4D, the slot 444 is not in one axial plane but contains a support ridge or pedestal 472 on which mount means 433 is mounted. Preferably, the support ridge 472 is mounted equidistant between the first axial end 468 and second axial end 470 of the pillow block. The support ridge 472 is shown extending radially toward the principal axis 406. However, the construction of the support ridge can be suitably made to provide support for the support means 433 on the bearing support plate 442.

The means to adjust the radial position of the bearing support plate 442 can be screw means communicating between the bearing support plate 442 across the axial slot 444 to the body 414 of the pillow block. The means to adjust in the embodiment of FIG. 4 are two cap screws. The first cap screw 473 is shown threaded through a first screw hole 474 to exert pressure against the pillow block body 414 on the opposite side in a radial direction from first screw hole 474. Second screw 475 passes through second screw 476 to thread into second screw threaded hole 477. Tightening the first screw forces the bearing support plate 414 away from the principal axis 406, while tightening the second screw forces the bearing support plate toward the principal axis 406. In this way the bearing support plate moves and adjusts the primary shaft 403, thus moving the roller bearing 432 to the selected position.

Figure 5:
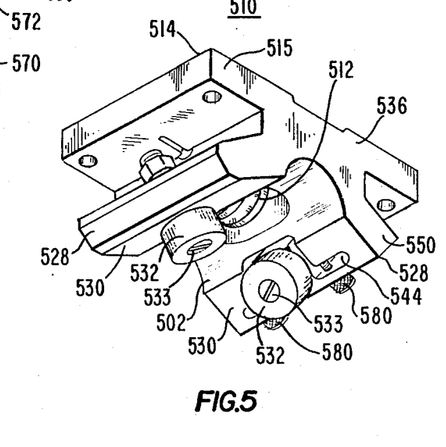
FIG. 5, includes three single ball bearing rollers which are mounted to the primary shaft. The means for adjusting the radial distance between the bearing mount plate is shown as two cap screws communicating between the bearing support plate and the body of the pillow block.
Figure 5A:
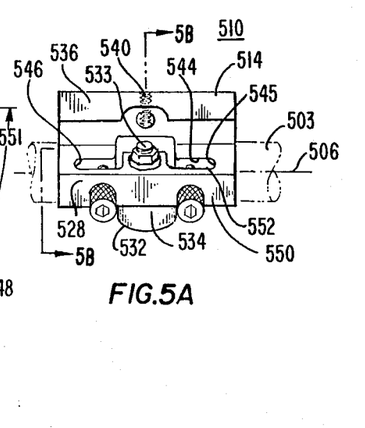
FIG. 5A is a side-elevation of FIG. 5 taken from the side having the fine tuner element of the present invention.
Figure 5B:
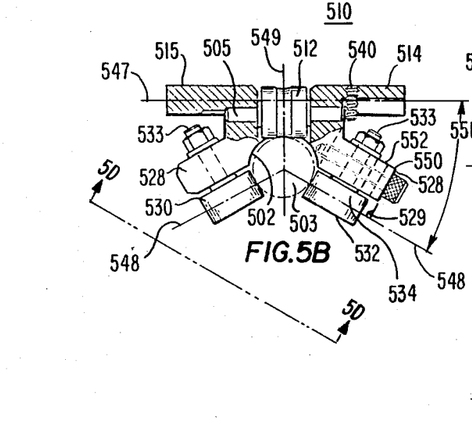
FIG. 5B is a partial elevation section through the plane indicated by the arrows 5B—5B of FIG. 5A.
Figures 5C, 5D:
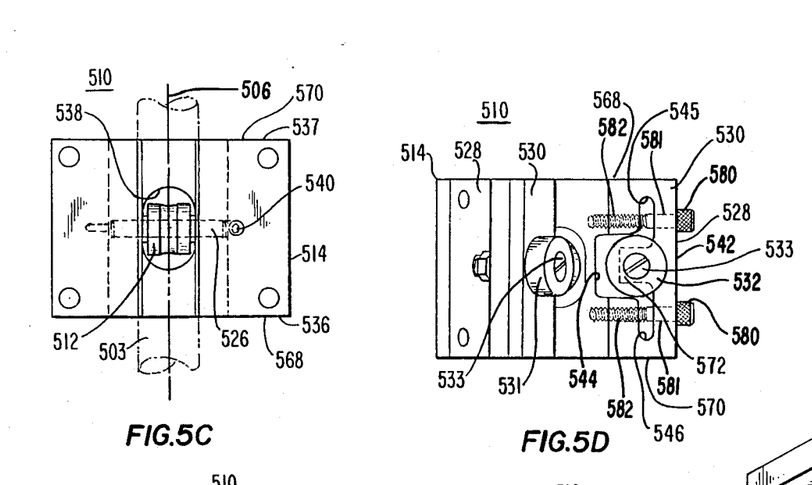
FIG. 5C is a top-elevation view of FIG. 5.
FIG. 5D is an elevation taken through the plane indicated by arrows 5D—5D of FIG. 5B.
Figure 6:
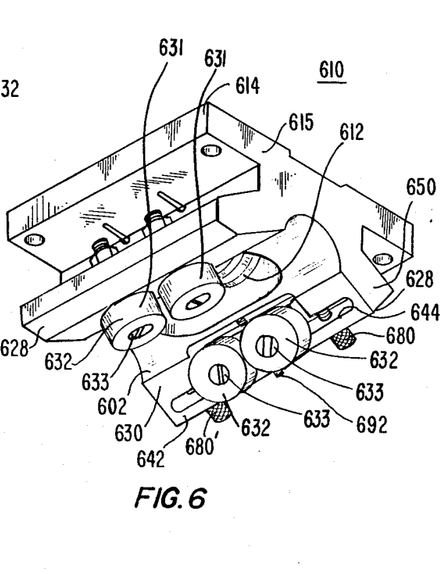
FIG. 6 includes three pairs of ball bearing rollers symmetrically disposed at angles spaced-apart 120 degrees in the cross-sectional plane to bear on the primary shaft in which the pillow block is journaled. The rollers are aligned in pairs, supported on an axis normal to the axis of the primary shaft. There is a bearing mount plate on which a pair of rollers are mounted. The bearing mount plate is controlled in a manner analogous to that of FIG. 6.
Figure 6A:
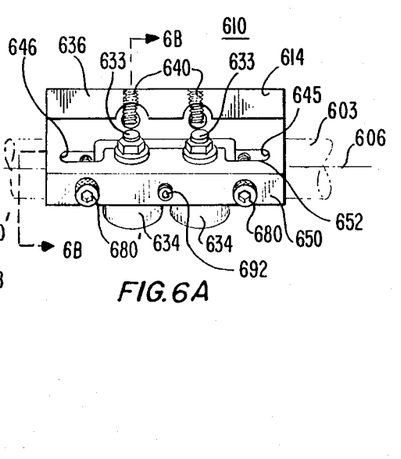
FIG. 6A discloses a side-elevation of FIG. 6 taken from the side having the fine tuner element of the present invention.
Figure 6B:
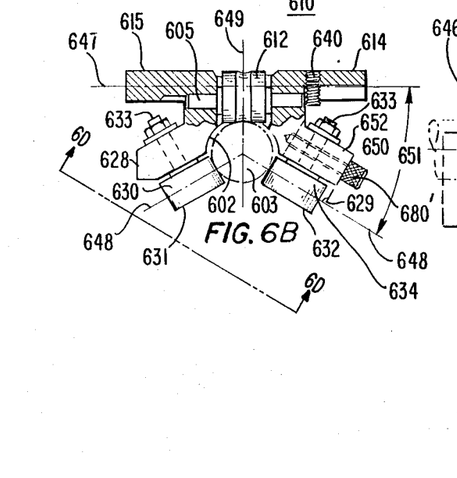
FIG. 6B is a partial sectional view through the plane indicated by arrows 6B—6B of FIG. 6A.
Figure 6C:
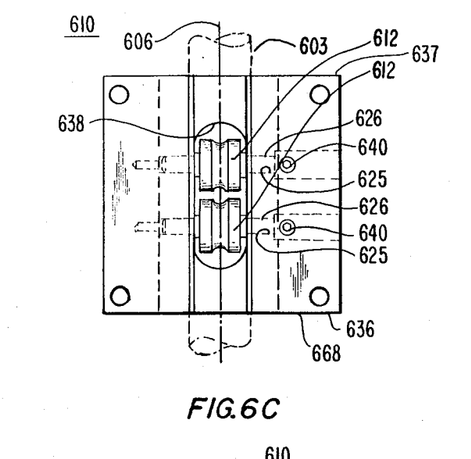
FIG. 6C is a top elevation of FIG. 6.

The embodiments in FIGS. 5 and 6 are similar to that of FIG. 4 with regard to the axial slot. In the embodiment in FIG. 5, there are two screw means to move the bearing support plate 542 toward the principal axis 506. The screw means 580 are located on opposite sides, at equal axial distances from the tuned bearing 532. In the specific embodiment illustrated the screw means are shown as two socket head cap screws. They pass through screw bores 581 across axial slot 544 and thread into threaded screw holes 582. By tightening the screws 580 they force the bearing support plate 542 radially toward the principal axis 506, upon loosening of the screw means the bearing support plate returns to its original position by its elastic forces.

Figure 6D:
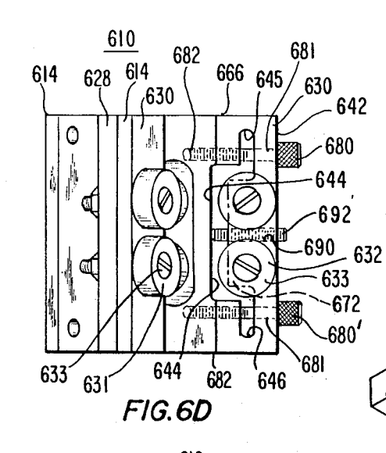
FIG. 6D is an elevation section through the plane indicated by arrows 6D—6D of FIG. 6B.

FIGS. 6 through 6D is a more complex embodiment of the present invention as illustrated in FIGS.1 through 2D, and FIGS. 5 through 5D. The pillow block of FIG. 6 has pairs of bearings axially adjacent to each other around the periphery of the primary shaft 603. The mount means 633 for each pair of bearings is at an equal radial distance from principal axis 606.

As shown in FIG. 6D, there are two threaded screw bores 681 and screw holes 682 on the opposite axial sides of the pair of tuned bearings 632. The screw bores pass through the bearing support plate 642 and are axially aligned with screw holes 682. Suitable screw means, such as cap screws 680, as shown in FIG. 6, pass through screw bores 681 and screw into screw holes 682. By tightening the screws 680 and 680', they force the bearing support plate 642 toward the principal axis 606.

This embodiment further comprises a thread set screw hole 690 passing through bearing support plate 642. The set screw hole 690 is aligned so that its axis passes through axial slot 644 and intersects the pillow block body. A screw means, such as set screw 692, is threaded through the set screw hole 690. Upon tightening set screw 692, the support plate 642 is directed radially away from principal axis 606.

In this embodiment the pillow block 610 can be adjusted by using set screw 692 as a pivot and independently loosening or tightening cap screws 680 and 681'. The pillow block can be adjusted along the axial direction.

Other distributions of the bearings can be used such as disclosed in U.S. Pat. No. 4,715,730.

It will be understood that the present invention is not limited to the particular embodiments described herein by way of example, but only by the scope of the appended claims.

What I claim is:
1. A pillow block comprising:
a body;
a primary bore having a principal axis constructed to be slideably accommodated on a primary shaft having a shaft surface;
a depending portion of said body including said primary bore having an outer surface partially surrounding said principal axis;
an axial slot disposed between said primary bore and said outer surface extending axially for a part of the axial length of said pillow block, said axial slot located at a radial distance from the axis of said primary bore;
said slot defining with the outer surface of said depending portion a bearing support plate having a bearing support surface;
at least one bearing mount on said bearing support surface;
at least one bearing mounted on said bearing mount, the bearing having a circumferential bearing surface disposed to make tangential contact with the primary shaft surface; and
means to adjust the radial distance of said bearing support plate relative to the principal axis of said primary bore.

2. The pillow block of claim 1 wherein the said bearing support plate has a major bearing surface in a plane parallel to said principal axis.

3. The pillow block of claim 2 wherein there are at least two bearings, having bearing planes which pass through the principal axis, there being a pillow block plane defined as a plane perpendicular to the support plane and passing through the principal axis, at least one bearing being located where the angle between the pillow block plane and the bearing plane is about 120 degrees and at least one bearing is located where the angle between the block plane and the bearing plane is about 240 degrees.

4. The pillow block of claim 1 wherein said axial slot extends from the primary bore to the outer surface.

5. The pillow block of claim 1 wherein said bearing is mounted on a roller bearing axle mounted on the bearing support plate at a distance of up to 0.25 inch from the axial slot.

6. The pillow block of claim 1 wherein said bearing support plate is flexible in the radial direction relative to the principal axis of said primary bore.

7. The pillow block of claim 6 wherein the means to adjust the radial distance of the bearing support plate relative to said principal axis comprises at least one screw means.

8. The pillow block of claim 6 wherein the means to adjust the radial distance of the bearing support plate relative to said principal axis comprises at least one screw means communicating across said axial slot located in the pillow block to exert radial pressure on said bearing support plate.

9. The pillow block of claim 8 wherein said axial slot has a first end and a second end, there being a radial slot from the second end communicating radially from the axial slot to the outer surface of said depending portion.

10. The pillow block of claim 9 wherein the radial slot has an axial jog at a distance between the axial slot and said outer surface, the axial Jog extending for part of the distance of said bearing support plate in a direction toward the first end of the axial slot, said bearing support plate comprising a free end ledge at the free end of said bearing support plate between and there being a tuner extension between the axial jog of the radial slot and said outer surface, the means to adjust the radial distance of the bearing support plate from said primary bore communicating between the tuner extension and said free end of said bearing support plate.

11. The pillow block of claim 1 wherein there are two roller bearings axially-disposed at each said bearing surface.

12. The pillow block of claim 1 wherein means to adjust the radial distance of the bearing support plate comprise means axially disposed on opposite sides of the two said bearings, and a means to adjust said radial support plate disposed axially between said two bearings.

13. The pillow block of claim 1 wherein said bearing support plate is sufficiently flexible to be adjusted by said means to adjust the radial distance, from plus to minus 0.050 inch, away from and toward said principal axis, and return to its original position upon being released.

14. A pillow block comprising:

a body having a first axial end and a second axial end;

a primary bore having a principal axis constructed to be slideably accommodated on a primary shaft having a shaft surface;

a depending portion of said body including said primary bore having an outer surface partially surrounding said principal axis;

an axial slot disposed between said primary bore and said outer surface extending axially for a part of the axial length of said pillow block between said first axial end and said second axial end, said axial slot located at a radial distance from the axis of said primary bore, said bearing support plate constructed and arranged to function as a diaphragm;

said slot defining with the outer surface of said depending portion a bearing support plate having a bearing support surface;

at least one bearing mount on said bearing support surface;

at least one bearing mounted on said bearing mount, the bearing having a circumferential bearing surface disposed to make tangential contact with the primary shaft surface;

means to adjust the radial distance of said bearing support plate relative to the principal axis of said primary bore.

15. The pillow block of claim 14 wherein said bearing support plate is flexible in the radial direction.

16. The pillow block of claim 15 wherein the means to adjust the radial distance of the bearing relative to said primary bore comprises at least one screw means.

17. The pillow block of claim 16 wherein the means to adjust the radial distance of the flexible bearing support plate relative to said primary bore comprises at least one screw means communicating across the axial slot located in said pillow block to assert radial pressure between said bearing support plate and said pillow block body.

18. The pillow block of claim 14 wherein said bearings comprise two bearings axially-disposed at each said bearing surface.

19. The pillow block of claim 18 wherein the means to adjust the radial distance of the bearing support plate comprise means axially disposed on opposite sides of the two said bearings and a means to adjust said radial support plate disposed axially between said two bearings.

20. The pillow block of claim 14 wherein said bearing support plate constructed and arranged to function as a diaphragm, is responsive to said means to adjust the radial distance to flex from plus to minus 0.050 inch, away from and toward the principal axis, and return to its original position upon being released.

* * * * *